United States Patent
Bish et al.

(10) Patent No.: US 9,959,048 B2
(45) Date of Patent: *May 1, 2018

(54) MANAGING A SET OF BLOCKS IN A STORAGE SYSTEM

(71) Applicant: International Business Machines Corporation, Armonk, NY (US)

(72) Inventors: Thomas W. Bish, Tucson, AZ (US); Nikhil Khandelwal, Tucson, AZ (US); Gregory E. McBride, Vail, AZ (US); David C. Reed, Tucson, AZ (US); Richard A. Welp, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/269,462

(22) Filed: Sep. 19, 2016

(65) Prior Publication Data

US 2016/0378380 A1    Dec. 29, 2016

Related U.S. Application Data

(63) Continuation of application No. 14/535,388, filed on Nov. 7, 2014.

(51) Int. Cl.
*G06F 12/00* (2006.01)
*G06F 3/06* (2006.01)

(52) U.S. Cl.
CPC .......... *G06F 3/0608* (2013.01); *G06F 3/064* (2013.01); *G06F 3/065* (2013.01); *G06F 3/0607* (2013.01); *G06F 3/067* (2013.01); *G06F 3/0619* (2013.01); *G06F 3/0631* (2013.01); *G06F 3/0652* (2013.01)

(58) Field of Classification Search
CPC .... G06F 3/0608; G06F 3/0607; G06F 3/0619; G06F 3/0631; G06F 3/064; G06F 3/065; G06F 3/0652; G06F 3/067
See application file for complete search history.

(56) References Cited

U.S. PATENT DOCUMENTS

| | | |
|---|---|---|
| 7,500,053 B1 | 3/2009 | Kavuri et al. |
| 7,596,586 B2 | 9/2009 | Gokhale et al. |
| 8,145,606 B2 | 3/2012 | Herbst et al. |
| 8,180,742 B2 | 5/2012 | Claudatos et al. |
| 8,898,267 B2 | 11/2014 | Slik et al. |
| 9,547,440 B2 | 1/2017 | Bish et al. |
| 2007/0179995 A1 | 8/2007 | Prahlad et al. |

(Continued)

OTHER PUBLICATIONS

Accelerated Examination Support Document, U.S. Appl. No. 15/726,109, dated Aug. 29, 2017, 18 pgs.

(Continued)

*Primary Examiner* — David X Yi
*Assistant Examiner* — Tahilba Puche
(74) *Attorney, Agent, or Firm* — Jay Wahlquist

(57) ABSTRACT

Disclosed aspects include management of a set of blocks in a storage system. A set of write requests is initiated to the set of blocks. In response to the set of write requests, a set of expiration metadata for the set of blocks is established. Based on the set of expiration metadata, an expiration event is detected. In response to detecting the expiration event, an expiration operation on the set of blocks is processed.

1 Claim, 5 Drawing Sheets

(56) References Cited

U.S. PATENT DOCUMENTS

| | | | |
|---|---|---|---|
| 2014/0095449 A1* | 4/2014 | Marwah | G06F 17/30073 707/668 |
| 2014/0108470 A1* | 4/2014 | Lad | G06F 3/0605 707/822 |
| 2014/0344234 A1 | 11/2014 | Amarendran et al. | |
| 2016/0378380 A1 | 12/2016 | Bish et al. | |

OTHER PUBLICATIONS

Accelerated Examination Support Document, U.S. Appl. No. 15/726,155, dated Aug. 29, 2017, 18 pgs.
Bish et al., "Managing a Set of Blocks in a Storage System", U.S. Appl. No. 15/726,109, filed Oct. 5, 2017.
Bish et al., "Managing a Set of Blocks in a Storage System", U.S. Appl. No. 15/726,155, filed Oct. 5, 2017.
List of IBM Patents or Patent Applications Treated as Related, Oct. 6, 2017, 2 pgs.
Mell et al., "The NIST Definition of Cloud Computing", National Institute of Standards and Technology, Special Publication 800-145. Sep. 2011. 7 pages.

* cited by examiner

MANAGING A SET OF BLOCKS IN A STORAGE SYSTEM

BACKGROUND

This disclosure relates generally to computer systems and, more particularly, relates to managing a set of blocks in a storage system. The amount of data that needs to be managed by enterprises is growing at an extremely high rate. Management of storage environments may need to be performed with as few errors as possible. As data needing to be managed increases, the need for management efficiency may increase.

SUMMARY

Aspects of the disclosure include policy-based data management at the block level within a storage subsystem. The policies allow for data to be archived or deleted after a specific amount of time passes after creation or last reference. For example, aspects disclosed include data storage archival and expiration management at the block level by a data storage controller to allow associating blocks of different host files based on common expiration.

Disclosed aspects include management of a set of blocks in a storage system. A set of write requests is initiated to the set of blocks. In response to the set of write requests, a set of expiration metadata for the set of blocks is established. Based on the set of expiration metadata, an expiration event is detected. In response to detecting the expiration event, an expiration operation on the set of blocks is processed.

In embodiments, the set of expiration metadata includes first expiration metadata for a first block of a first file. The set of blocks includes both the first block and a second block of a second file. The first file may be different from the second file. In embodiments, the set of blocks includes a specific block (e.g., first block) having a header configured to include specific expiration metadata (e.g., first expiration metadata). In embodiments, a data storage controller is used to establish the set of expiration metadata for the set of blocks.

Aspects of the disclosure include creating, based on the set of expiration metadata, an expiration stack for the set of blocks. The expiration stack may be organized based on a temporal feature. The temporal feature can include a common expiration trigger for the set of expiration metadata. In embodiments, the expiration stack may be organized using a first-in-first-out order. The expiration stack can be used to process the expiration operation.

DETAILED DESCRIPTION

Figure 1A:
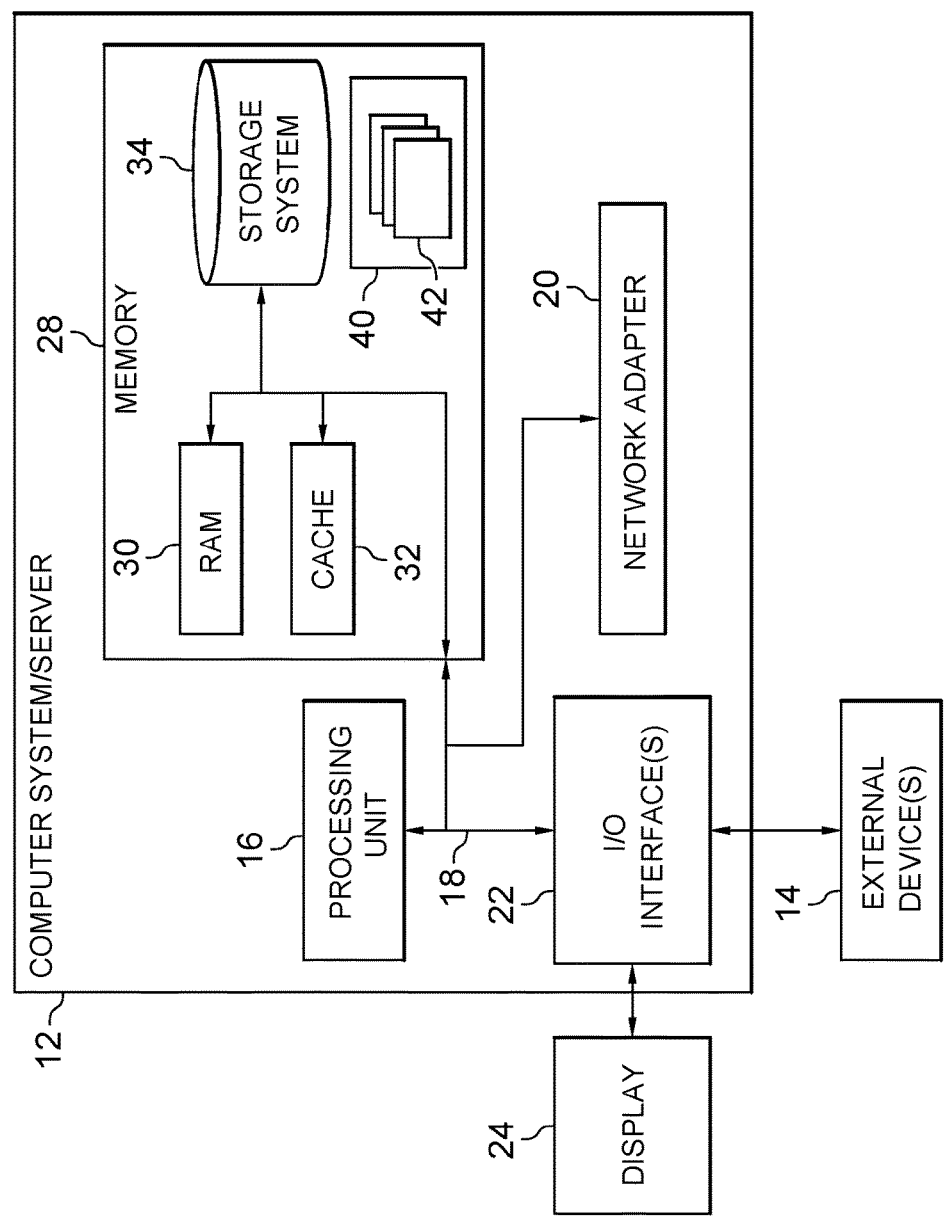
FIG. 1A depicts a cloud computing node according to embodiments.

Aspects of the disclosure include policy-based data management at the block level within a storage subsystem. Management policies are constructed at the block level. Diverse policies control how blocks of data are expired or moved to other forms of storage media. The storage media can include other disks, tape, or object stores. The policies allow for data to be archived or deleted after a specific amount of time passes after creation or last reference. Such policy information and data age or activity is then used to remove specific blocks or ranges of blocks of data. For example, aspects disclosed include data storage archival and expiration management at the block level by a data storage controller to allow associating blocks of different host files based on common expiration.

Traditionally, data has been managed at the file level. Such traditional management includes operations such as migration and expiration. However, such operation within the storage subsystem at a block level may be desired. Block level of management with the storage subsystem may provide performance or efficiency benefits along with reduced overall storage cost for storage utilization and vitalization. Such aspects may have positive impacts on user and application involvement. User may desire to be able to define different policies for different types of data. For example, a user e-mail may have a different retention policy than organization tax documents. As data becomes more virtualized in cloud environments, providing logic at the block level within the storage subsystem can have positive impacts on data management in or outside of the cloud.

Aspects of the disclosure include a method, system, and computer program product for managing a set of blocks in a storage facility (i.e., storage system). The method, system, and computer program product may work on a number of operating systems. A set of write requests is initiated to the set of blocks. In response to the set of write requests, a set of expiration metadata for the set of blocks is established. Based on the set of expiration metadata, an expiration event is detected. In response to detecting the expiration event, an expiration operation on the set of blocks is processed.

In embodiments, the set of expiration metadata includes first expiration metadata for a first block of a first file. In addition, the set of expiration metadata may include second expiration metadata for a second block of a second file. The set of blocks includes both the first block and the second block. The first file may be different from the second file. In embodiments, the set of blocks includes a specific block (e.g., first block) having a header configured to include specific expiration metadata (e.g., first expiration metadata). In embodiments, a data storage controller is used to establish the set of expiration metadata for the set of blocks. Establishing the set of expiration metadata for the set of blocks can include creating the set of expiration metadata, writing the set of expiration metadata to a set of headers of the set of blocks, and storing the set of expiration metadata in a data store communicatively coupled with the data storage controller.

Aspects of the disclosure include creating, based on the set of expiration metadata, an expiration stack for the set of blocks. The expiration stack may be organized based on a temporal feature. The temporal feature can include a common expiration trigger for the set of expiration metadata. In embodiments, the expiration stack may be organized using a first-in-first-out order. The expiration stack can be used to process the expiration operation.

In embodiments, detecting an expiration event based on the set of expiration metadata includes various aspects. The set of expiration metadata may be analyzed to identify an expiration trigger that is based on a temporal feature. Monitoring for the expiration trigger can occur. In response to monitoring for the expiration trigger, accomplishment of the expiration trigger may be determined. In response to determining accomplishment of the expiration trigger the expiration event can be instantiated.

The storage system may include a set of cloud nodes configured to store the set of blocks based on the set of expiration metadata. In embodiments, the set of expiration metadata includes both first expiration metadata for a first block of a first file and second expiration metadata for a second block of a second file, the set of blocks includes both the first block and the second block, and the first file is different from the second file. As such, by comparing the first expiration metadata and the second expiration metadata, a common expiration trigger for the first and second blocks may be determined. When the first and second blocks share a common expiration trigger, a concurrent expiration operation for the first and second blocks may be initiated. Processing the expiration operation on the set of blocks (or the concurrent expiration operation for the first and second blocks) may include removing the set of blocks from the storage system. Altogether, aspects of the disclosure provide a methodology for managing a set of blocks that may provide performance or efficiency benefits.

It is understood in advance that although this disclosure includes a detailed description regarding cloud computing, implementation of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1A, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
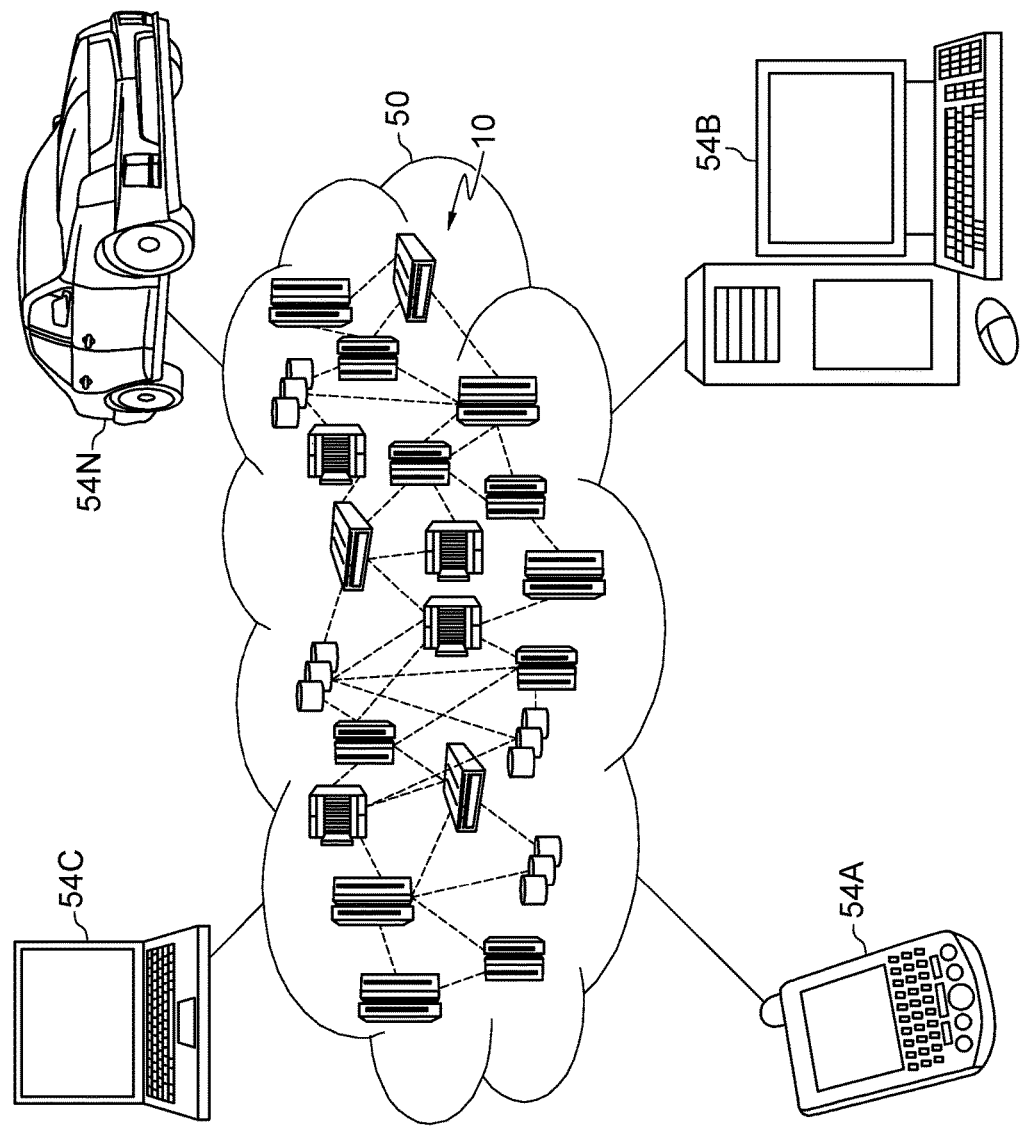
FIG. 1B depicts a cloud computing environment according to embodiments.

Referring now to FIG. 1B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 1C:
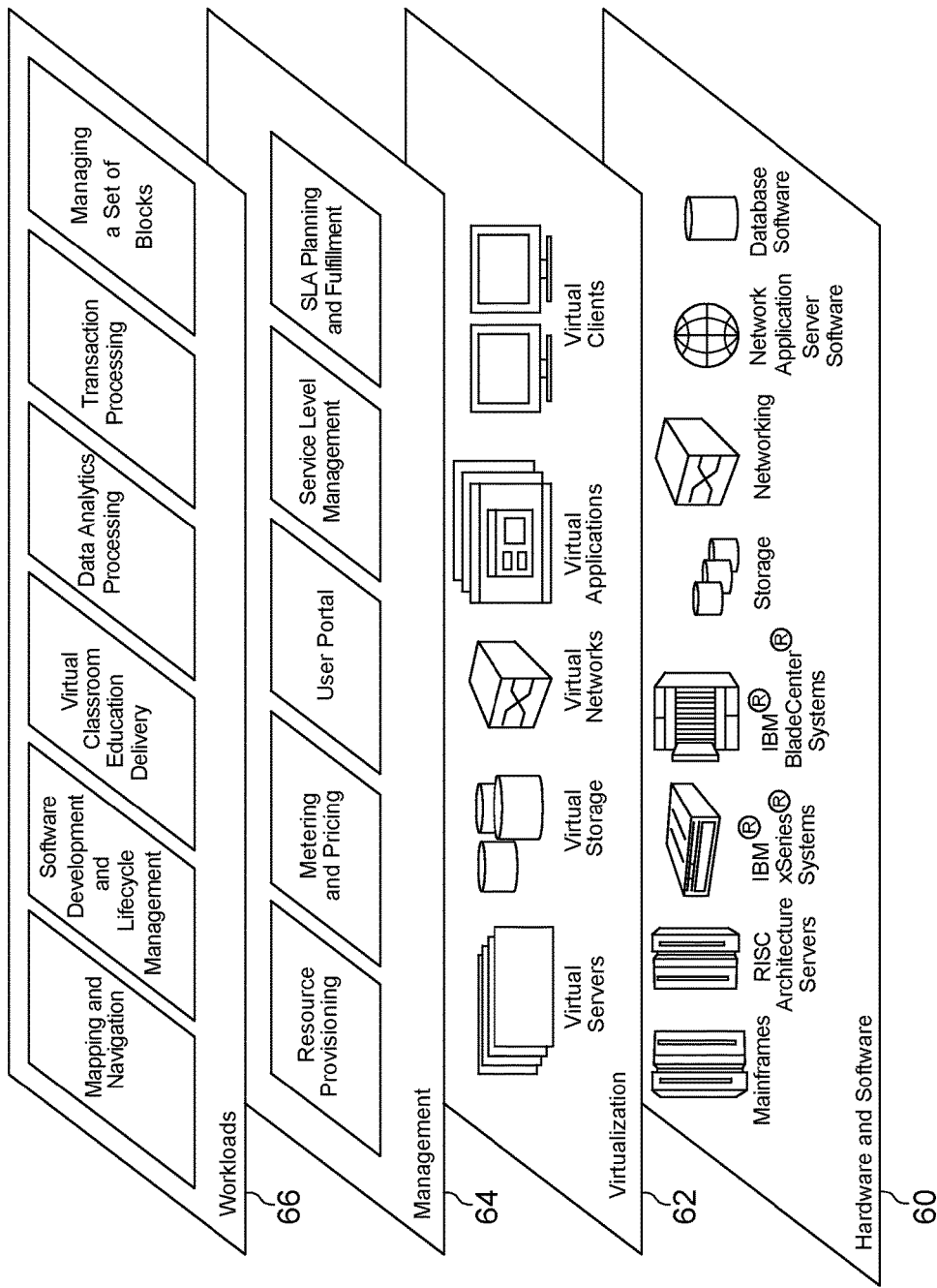
FIG. 1C depicts abstraction model layers according to embodiments.

Referring now to FIG. 1C, a set of functional abstraction layers provided by cloud computing environment 50 (FIG. 1B) is shown. It should be understood in advance that the components, layers, and functions shown in FIG. 1C are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing a set of blocks. Managing a set of blocks may provide data storage archival and expiration management at the block level. A data storage controller may be used to allow associating blocks of different host files based on common expiration.

Figure 2:
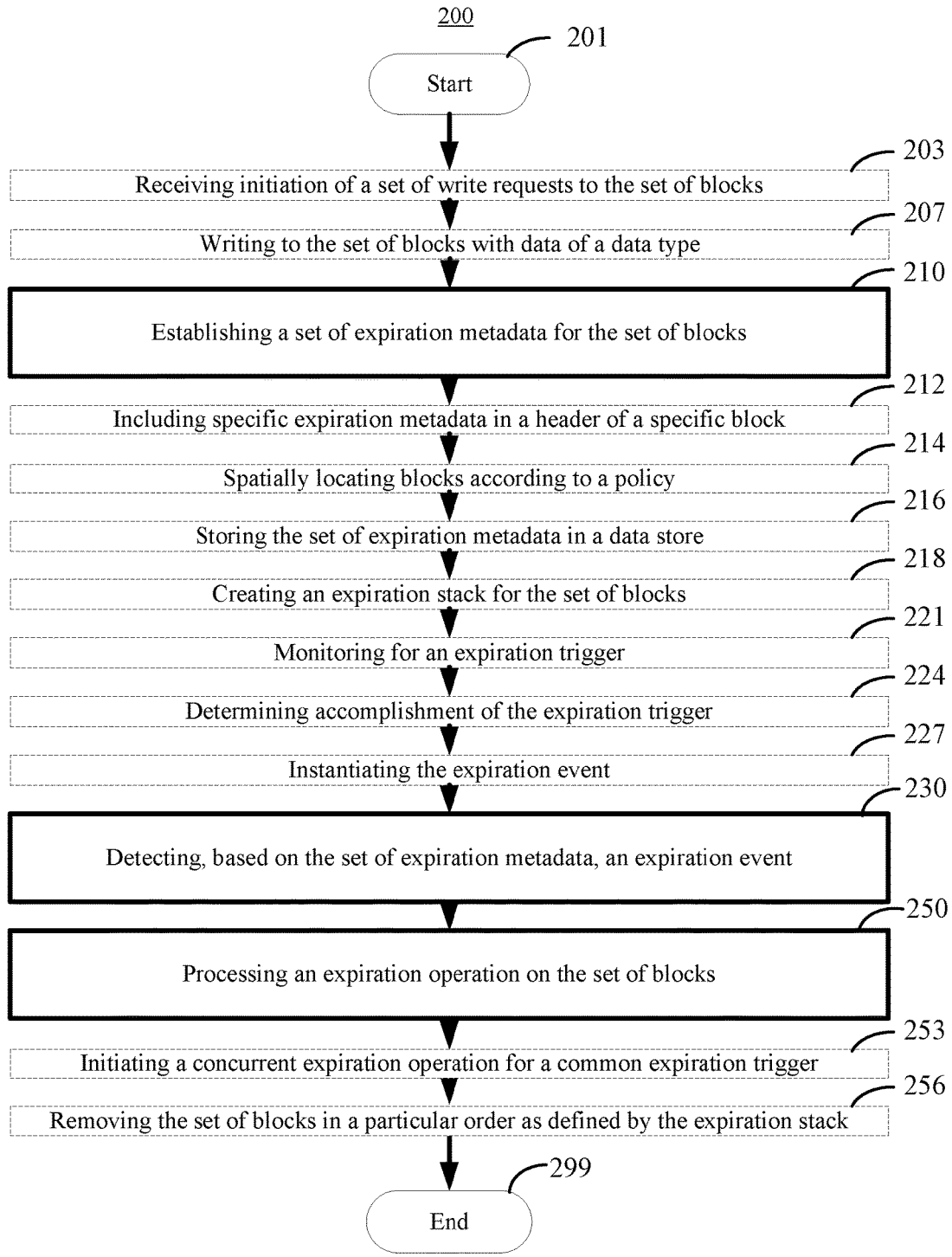
FIG. 2 is a flowchart illustrating a method for managing a set of blocks in a storage system according to embodiments.

FIG. 2 is a flowchart illustrating a method 200 for managing data in a storage system according to embodiments. Aspects of method 200 may include policy-based data management at the block level. The policies influence how blocks of data are expired or moved to other forms of storage media. The policies allow for data to be archived or deleted after a specific amount of time passes after creation or last reference. Such data of policy and data age or activity is then be used to remove specific blocks or ranges of blocks of data. Method 200 may begin at block 201.

At block 203, a set of write requests is initiated to the set of blocks. Subsequently at block 207, the set of blocks is written with data of a data type. In response to the set of write requests being initiated, a set of expiration metadata for the set of blocks is established at block 210. The set of expiration metadata can include a retention policy (e.g., a time span of how long to keep the set of blocks). The retention policy can be based on a creation temporal feature (e.g., creation timestamp), a last-referenced temporal feature (e.g., a staleness value based on a usage timestamp), or a combination of temporal features that may include reference frequency information (e.g., more frequently referenced data may be retained for a longer time span).

In embodiments, the set of expiration metadata includes first expiration metadata for a first block of a first file. In addition, the set of expiration metadata includes second expiration metadata for a second block of a second file. The set of blocks includes both the first block and the second block. The first file may be different from the second file. Thus, operations may be handled at the block level rather than the file level even with separate files. Analysis of the data to be written by the set of write requests may be efficiently bypassed because expiration can be handled without such analysis (e.g., the substance of the write requests need not be analyzed because, for example, a retention policy based on a temporal feature may be utilized).

In embodiments, the set of blocks includes a specific block (e.g., first block) having a header configured to include specific expiration metadata (e.g., first expiration metadata) such as at block 212. The header, for example, includes a policy regarding block expiration and may be set at creation of the block. Such as at block 214, blocks may be spatially located according to the policy. Use of the header permits dispersal of blocks with similar policies across a storage media or a set of cloud nodes. In embodiments, dispersal may provide efficiency benefits, for example, when using a set of cloud nodes across a large geographic region. In other embodiments, data can be grouped together based on headers having similar policies. Certain embodiments may include a combination of grouping and dispersing similar policies based on user specifications. For example, in a cloud-based environment, a user may want sensitive personnel information with a given retention policy grouped in a particular region while publicly available information with the given retention policy may be dispersed across many regions.

In embodiments, a data storage controller is used to establish the set of expiration metadata for the set of blocks. Establishing the set of expiration metadata for the set of blocks includes creating the set of expiration metadata (e.g., generating temporal features such as creation or use dates). Establishing the set of expiration metadata for the set of blocks can include writing the set of expiration metadata to a set of headers of the set of blocks (e.g., assigning a chosen policy to a header using an access operation). Establishing the set of expiration metadata for the set of blocks can include, such as at block 216, storing or saving the set of expiration metadata in a data store communicatively coupled with the data storage controller (e.g., saving in a catalog or list that may be linked to the data storage controller or part of the data storage controller).

Aspects of the disclosure include creating, based on the set of expiration metadata, an expiration stack for the set of blocks at block 218. The expiration stack includes a stack of metadata (e.g., grouping of metadata of an assembly of the set of blocks). The expiration stack may be organized based on a temporal feature (e.g., a computed retention termination date based on creation/use factors). The temporal feature can include a common expiration trigger for the set of expiration metadata (e.g., a number of identical retention dates may produce a common expiration trigger). In embodiments, the expiration stack may be organized using a first-in-first-out order (e.g., ordering may be based on retention termination date and then creation date).

Based on the set of expiration metadata, an expiration event is detected at block 230. The expiration event can include a criterion being reached such as a date (e.g., retention policy date reached), a business event (e.g., merger-acquisition completion), or a personnel event (e.g., a student graduates from an institution and no longer needs electronic access). In embodiments, detecting an expiration event based on the set of expiration metadata includes various aspects. The set of expiration metadata may be analyzed to identify an expiration trigger that is based on a temporal feature (e.g., retention policy date, graduation date). At block 221, monitoring for the expiration trigger can occur (e.g., pinging entity systems for user status/presence).

In response to monitoring for the expiration trigger, at block 224 accomplishment of the expiration trigger may be determined (e.g., lack of activity of an electronic account for a threshold period of time). In response to determining accomplishment of the expiration trigger the expiration event can be instantiated (e.g., begin addressing the matter the expiration metadata was intended to indicate) at block 227. The expiration event indicates when a particular block is ready to be expired without respect to how data is structured or possible hierarchies. For example, data structure information may have limited relevance to removing the particular block.

In response to detecting the expiration event, an expiration operation on the set of blocks is processed at block 250. The expiration stack is used to process the expiration operation. For example, processing in a particular order as defined by the expiration stack (see block 256). Processing the expiration operation on the set of blocks may include removing the set of blocks from the storage system as at block 256. For example, once an individual block has expired, the individual block can be removed from the storage system. Removing can be deleting or, in embodiments, archiving. Such removal may occur regardless of a state of a backup for an individual file having the individual block. As such, no trace of the individual block may remain.

The storage system may include a set of cloud nodes configured to store the set of blocks based on the set of expiration metadata. In embodiments, the set of expiration metadata includes both first expiration metadata for a first block of a first file and second expiration metadata for a second block of a second file, the set of blocks includes both the first block and the second block, and the first file is different from the second file. As such, by comparing the first expiration metadata and the second expiration metadata, a common expiration trigger for the first and second blocks may be determined. For example, the common expiration trigger may include a same date (e.g., December 31) for the first and second blocks to be removed. In other embodiments, the common expiration trigger may be an event count (e.g., when the stock market closes up for 50 days of a given year).

In embodiments, blocks may be physically segregated on storage media so that location implies a management policy. For example, blocks for user e-mail may be located together in a first region and blocks for organization tax documents may be located together in a second region. When the first and second blocks share a common expiration trigger, a concurrent expiration operation for the first and second blocks may be initiated as at block 253. For example, organization tax documents for a given year physically located in a given region may employ the concurrent expiration operation for first and second blocks having organization tax documents for the given year. Similarly, if a user e-mail block shares a common expiration trigger with an organization tax document block, then the concurrent expiration operation for the first and second blocks may be initiated. As such, the common expiration trigger may indicate initiation of the concurrent expiration operation even if blocks are physically located in different regions.

Method 200 concludes at block 299. Aspects of method 200 may provide performance or efficiency benefits when managing a set of blocks. For example, aspects of method 200 include data storage archival and expiration management at the block level by a data storage controller to allow associating blocks of different host files based on common expiration. Altogether, a storage system may be managed more efficiently.

Figure 3:
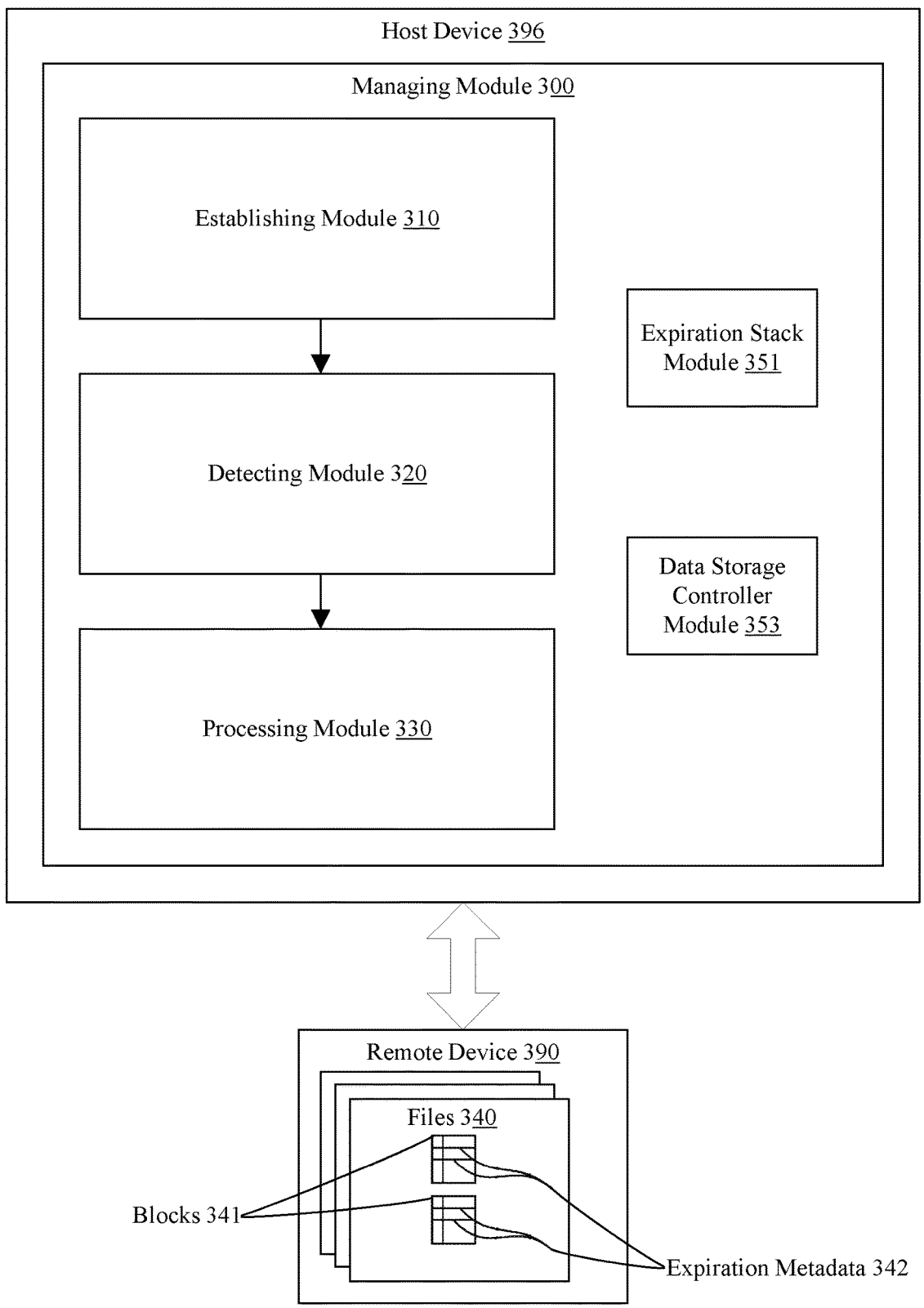
FIG. 3 shows modules of a system for managing a storage facility according to embodiments.

FIG. 3 shows modules of a system for managing a storage facility according to embodiments. In embodiments, method 200 may be implemented using one or more modules of FIG. 3. As such, all aspects of the discussion related to FIG. 2 and method 200 may be used/applied/implemented in the system. The modules of FIG. 3 may be implemented in hardware, software or firmware executable on hardware, or a combination thereof. For example, module functionality that may occur in a host device 396 may actually be implemented in a remote device 390 and vice versa. Other functionality may be distributed across the host device 396 and the remote device 390. The remote device 390 may have files 340 comprising storage blocks 341 having expiration metadata 342. The host device 396 may include a managing module 300.

The managing module 300 may be configured and arranged to manage a storage facility. Managing module 300 can manage a set of blocks in the storage facility. The managing module 300 may include an establishing module 310 (see discussion related to FIG. 2, block 210), a detecting module 320 (see discussion related to FIG. 2, block 230), a processing module 330 (see discussion related to FIG. 2, block 250), an expiration stack module 351, and a data storage controller module 353.

Aspects of the managing module 300 include policy definition, expiration management, and archival management. The policy definition may allow a user to specify specific management policies for use with user data. The user can specify the type of data that belongs in each policy group. The data storage controller module 353 may operation a set of controllers (e.g., a controller). When the data is passed to the set of controllers to be written to storage, the set of blocks of data may contain header information that describes the policy that is assigned to each/particular block of the set of blocks. As the controller processes the set of blocks, it can record the policies in an internal data store. For the policy groups, the user may specify a retention policy. The retention policy is how long to keep the particular block after the first creation period of the particular block, last referenced period of the particular block, or combination of the two. For example, if a tax related document must be stored for three years, the set of blocks of data associated with that policy may have an expiration date of three years after creation. Another example would be where a user would want to keep all e-mails a minimum of two years and not referenced within six months. After this period, the policy could be set to archive these e-mails. As both conditions become met, the archival function can be triggered.

Expiration management and archival management may use expiration metadata stored within the storage controller which has creation data and reference data for the set of blocks of data. As a particular block of the set of blocks of data is written within the storage system, it is assigned to one of the predefined policy groups. This data can then be grouped in a region of similar policy data, or the user can elect to have the data dispersed within the storage subsystem in a manner that includes an indication of the policy group it belongs to within the block (e.g., in the header).

Expiration metadata stored within the controller can be organized, for expiration processing, in a (first-in-first-out) expiration stack for a given policy using the expiration stack module 351. As an expiration trigger (e.g., date) of a block of the set of blocks meets the expiration criteria (e.g., occurrence of expiration event), the expiration metadata for the block of the set of blocks of storage may be together/adjacent in the expiration stack(s). Those blocks may then be removed via an expiration operation and the areas can be made available to be reused by other blocks of data. After processing the expiration operation, the storage subsystem may no longer contain those blocks of data. An attempt to reference those blocks may result in a block not found condition and no data may be returned on the access request.

A controller may maintain information regarding blocks that it has been given control of and their location. If a policy of a particular block indicates that the data has been off-loaded to a different storage medium (e.g., tape or slower disks), the controller can track where the data has been sent for future references for the data. Similarly, if a block has reached an expiration event and the policy indicates to delete the data, the controller can track that these blocks have been deleted, and can send an appropriate message back to the file system.

Processing an expiration operation that includes archival may similarly create a first-in-first-out stack for a given policy. As an individual block of data meets the archival criteria selected by the user, the individual block of data is not deleted but it is instead moved to a slower less expensive storage media, such as tape. The block tape location is then added to an archival mapping structure data base. When a request for this block is received by the storage subsystem, and is not found to be primary tier location, the archival mapping structure is used to identify the location of the block. The block is then retrieved back to the primary tier media and the access request may be put into a wait condition until the block is retrieved. Blocks can be grouped in such a fashion that multiple archived blocks can be retrieved when any one of the blocks are referenced.

Aspects of managing module 300 may provide performance or efficiency benefits when managing a set of blocks. For example, aspects of managing module 300 include data storage archival and expiration management at the block level by a data storage controller to allow associating blocks of different host files based on common expiration. Altogether, a storage facility may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method for managing a set of blocks in a storage system, the method comprising:
    establishing, in response to a set of write requests to the set of blocks, a set of expiration metadata for the set of blocks, wherein the set of expiration metadata includes both first expiration metadata for a first block of a first file and second expiration metadata for a second block of a second file, the set of blocks including both the first block and the second block and the first file being different from the second file, and wherein the first expiration metadata and the second expiration metadata include a respective retention policy based on a creation timestamp, a usage timestamp, and reference frequency information;
    spatially locating the first block and the second block in the storage system according to the respective retention policy;
    creating, based on the set of expiration metadata, an expiration stack for the set of blocks, the expiration stack organized based on a temporal feature that includes a common expiration trigger for the set of expiration metadata, the temporal feature based on a retention termination date and a creation date such that the expiration stack is organized using a first-in-first-out order based on the retention termination date and the creation date;
    comparing the first expiration metadata and the second expiration metadata to identify the common expiration trigger for the first and second blocks;
    monitoring for the common expiration trigger by pining entity systems for user status; determining accomplishment of the expiration trigger based on lack of activity of an electronic user account for a threshold period of time;
    and in response to determining accomplishment of the expiration trigger, processing an expiration operation on the set of blocks based on the expiration stack;

wherein processing the expiration operation includes removing the set of blocks from the storage system in an order defined by the expiration stack, wherein the set of blocks are removed regardless of a state of a backup for the first file and the second file.

\* \* \* \* \*